United States Patent
Ravex et al.

(10) Patent No.: US 6,310,903 B1
(45) Date of Patent: Oct. 30, 2001

(54) GAS LASER DEVICE AND INTEGRATED GAS PURIFYING MEANS

(75) Inventors: Alain Ravex, Deylan; Patrick Laborde, La Frette/Seine; Robert Stehle, La Garenne, all of (FR)

(73) Assignees: Commissariat a l'Energie Atomique, Paris; Societe de Production et de Recherches Appliquees "Sopra", Bois Colombes, both of (FR)

( * ) Notice: Subject to any disclaimer, the term of this patent is extended or adjusted under 35 U.S.C. 154(b) by 0 days.

(21) Appl. No.: 09/341,098
(22) PCT Filed: Nov. 2, 1998
(86) PCT No.: PCT/FR98/02340
  § 371 Date: Nov. 26, 1999
  § 102(e) Date: Nov. 26, 1999
(87) PCT Pub. No.: WO99/23732
  PCT Pub. Date: May 14, 1999

(30) Foreign Application Priority Data

Nov. 3, 1997 (FR) .................................................. 97 13793

(51) Int. Cl.[7] ...................................................... H01S 3/22
(52) U.S. Cl. .................................. 372/59; 372/57; 372/58
(58) Field of Search .................................. 372/55, 57, 59, 372/90, 69

(56) References Cited

U.S. PATENT DOCUMENTS

| | | | | |
|---|---|---|---|---|
| 4,629,611 | * | 12/1986 | Fan ........................................ | 423/240 |
| 4,740,982 | * | 4/1988 | Hakuta et al. ......................... | 372/59 |
| 5,396,514 | * | 3/1995 | Voss ....................................... | 372/57 |
| 5,771,260 | * | 6/1998 | Elliot et al. ........................... | 372/109 |

FOREIGN PATENT DOCUMENTS 3536749   4/1986   (DE) .

OTHER PUBLICATIONS

Oxford Lasers, 3 pages, "The GP2000–X Series Excimer Laser Gas Purifiers", Mar. 1990.

Oxford Lasers, 8 pages, "Cryogenic Processing of Excimer Laser Gas Mixtures", Jul. 1991.

* cited by examiner

Primary Examiner—Teresa M. Arroyo
Assistant Examiner—James Menefee
(74) Attorney, Agent, or Firm—Oblon, Spivak, McClelland, Maier & Neustadt, P.C.

(57) ABSTRACT

A gas laser device. The device includes a laser chamber having at least one active gas and a device for purifying gas. The purified gas is in communication with the free exchange of gas with the chamber. This device may be used with high powered gas lasers.

11 Claims, 4 Drawing Sheets

PRIOR ART  FIG. 1

GAS LASER DEVICE AND INTEGRATED GAS PURIFYING MEANS

BACKGROUND OF THE INVENTION

1. Field of the Invention

The present invention relates to an active gas laser device comprising integrated means of purifying the active gas.

2. Discussion of the Background

A distinction is made between several categories of gas lasers, depending on their sensitivity to operating conditions and as a function of the rate at which their active medium (gas) degrades.

A first category includes sealed gas lasers for which operation and operating conditions do not change the characteristics of the active gas or gases, or only change them very little.

The performances of this type of laser are very stable in time and no action on the active medium is necessary.

For example, this first category includes HeNe lasers, $CO_2$ lasers with wave guides, and low power argon or krypton lasers.

A second category includes sealed gas lasers for which operation and operating conditions slowly change the characteristics of the active gas or gases. These lasers require very little technical action on the active medium.

For example, the second category includes argon or krypton lasers with an output power of the order of one Watt. A service operation is necessary on these lasers after about 1000 or 2000 hours of operation. Usually, the sealed head of these lasers is replaced.

Finally, there is a third category of lasers for which operation and operating conditions quickly change the active gas mixture. Therefore, the amplifying medium of these lasers must be regenerated frequently.

The third category includes high power $CO_2$ lasers (of the order of a kilowatt) and excimer lasers.

Excimer lasers require servicing about once every week, and the performances of these lasers degrade continuously between two service operations.

For lasers in the third category, it is possible to work without recovering the gas, or to renew all or as part of the gas mixture, whichever is preferred. Some active media may also be purified and regenerated.

Therefore, the device according to the present invention is more particularly applicable to lasers in which the active medium may be regenerated, particularly by purification of gas contained in the laser chamber. Excimer lasers form part of the above described third category and will be explained in more detail below.

An excimer laser is a gas laser capable of emitting light within the ultra-violet spectral range, in a pulsed mode.

A cavity in an excimer laser contains a gas mixture that forms an amplifying medium and which produces the laser effect. This mixture comprises essentially an halogen compound (fluorine/chlorine) in molecular form, a rare gas such as krypton, xenon or argon, and a buffer gas, for example such as neon or helium.

The energy efficiency of the laser and the quality of the light beam emitted depend on a number of parameters and operating conditions, including the partial pressures of the various gases in the gas mixture and excitation of the amplifying medium (gas mixture).

Pre-ionization, for example by X-ray or ultra-violet radiation, or by a corona effect preliminary discharge, contributes to controlling the electrical pumping discharge, in other words controlling excitation of the amplifying medium.

The purity of gases in the amplifying medium is another parameter that is important for obtaining good energy efficiency and a high quality beam.

The purity of the gases in the amplifying medium contained in a chamber may be affected by chemical reactions. For example, these reactions take place between the excited halogen compounds and the walls of the chamber.

Furthermore, it is found that the laser cavity sealing elements may also form sources of pollution of the amplifying medium.

Finally, the quality of the gases in the amplifying medium may be degraded by parasite chemical combinations. New molecules formed by chemical combination of the various molecules of the mixture can absorb radiation and therefore reduce the performances of the laser.

In order to prevent a drop in the quality of the laser beam (stability in amplitude, beam uniformity, energy) and in the efficiency of the laser cavity, it is possible to either renew gases in the active medium, particularly by adding new halogen compounds, or to eliminate undesirable gases in the gas mixture.

In particular, a number of undesirable halogen molecules appearing in the gas mixture may be trapped by a cryogenic effect outside the laser. For example, these molecules include $CCl_4$, $CF_4$, $HF$.

Elimination of undesirable molecules requires precise control of the temperature of a cryogenic trap. This temperature varies as a function of the compounds to be eliminated and therefore as a function of the molecules initially present in the active medium mixture.

Table I below contains examples of pure gases that may be added to the mixture to regenerate it and the temperature of a cryostat capable of trapping undesirable molecules, for a number of active molecules.

TABLE I

| Active molecules | XeCl | XeF | ArF | KrF |
| --- | --- | --- | --- | --- |
| Pure gases added to the active mixture | | | | |
| Ar | | | * | |
| Kr | | | | * |
| Xe | * | * | | |
| $F_2$ | | * | * | * |
| HCl | * | | | |
| Ne | * | * | * | *  |
| Cryostat temperature | 130° K | 130° K | 90° K | 100° K |

FIG. 1 illustrates a particular example embodiment of a known type of gas purifier associated with a gas laser.

Reference 10 in the figure denotes a laser chamber containing an active amplifying medium in the form of a gas mixture. Reference 12 denotes a cryogenic trap purifier connected to chamber 10 in order to regenerate the gas mixture.

An outlet 14 from the chamber 10 is connected to the purifier 12 through a pipe 16. Gas taken from chamber 10 passes through the purifier 12 and, after being purified, in other words separated from its undesirable constituents, is reinjected into chamber 10 through a pipe 18. Pipe 18 connects the purifier 12 to a gas inlet 20 to chamber 10.

The purifier 12 includes a dust filter 22, a circulation pump 24 and a cryostat 26, in order starting from its inlet.

These elements are connected to a tube 27. Furthermore, isolating valves 28, 30, are provided at the purifier inlet and outlet irrespectively.

The circulation pump 24 circulates the gas mixture from the chamber 10 through a heat exchanger 32 in the cryostat in which the gas is cooled. The gas is cooled by means of a heat conducting core 34, the first end of which is immersed in a bowl of liquid nitrogen 36. A second end of the core 34 is equipped with an electrical heating resistance 35 that precisely adjusts a heat balance in the core and therefore the temperature of gases passing through the heat exchanger 32.

The cryostat traps impurities in the gas mixture by condensation and partial crystallization of these impurities, in the bottom part of tube 27.

A reverse flow heat exchanger 38 is also provided between the gas outlet from purifier 12 and the gas inlet. This exchanger pre-cools the gas to be purified by retrieving at least part of the enthalpy from the purified cold gas.

Finally, an extraction valve 40 and a vacuum pump 42 are provided to empty the purifier 12.

Periodically, isolating valves 28, 30 of the purifier 12 are closed to isolate the purifier 12 from the laser chamber 10. The part of the tube between the valves is then heated to enable evaporation and extraction of accumulated residues of impurities, using the vacuum pump.

A second inlet 21 into the laser chamber 10 is connected to gas cylinders 44, 46 and 48 containing the rare gas, the gas containing halogen compounds and the buffer gas respectively. These gas cylinders are used to inject the new gas mixture into the chamber 10.

A device of this type is known and is commercially available. See, an article entitled "The GP-2000X Series Excimer Laser Gas Purifiers" by Oxford Lasers (1990), an article entitle "Cryogenic Processing of Excimer Laser Gas Mixtures" by Oxford Lasers (1991), and European Patent Publication No. EP-A-430 411).

Note that installations of the type described above are not included in lasers, but are available as auxiliary equipment.

A number of obstacles make it impossible to include cryogenic purification equipment directly in the laser device.

The first obstacle is related to vibrations emitted by vacuum and circulation pumps. These vibrations could disturb the stability of the laser beam.

Furthermore, a complete system including a laser and purification equipment would be particularly cumbersome and difficult to transport.

Finally, the global cost of a complete system of this type would be very high, particularly due to the complexity of the purification device.

Furthermore, purification devices conforming with FIG. 1 include a number of difficulties related to circulation of gases from the laser chamber. Pipes from the purifier must be equipped with mechanical and electromechanical means for controlling gas pressures and flows.

Furthermore, pumps used to circulate the gases must be specially designed to resist corrosive gases in the active mixture and must be capable of operating in a pressure range varying from a vacuum up to about 10 bars.

These constraints also contribute to the increasing cost of purifiers. Germen Patent Publication No. DE-A-3 130 588 describes another type of laser gas purifier in which the impurities are liquefied by reducing the pressure of the gas mixture. The pressure is reduced in several steps. The gas passage in the purifier during the pressure reduction steps is caused by an alternating set of pumps and valves.

Thus, difficulties similar to the difficulties mentioned above also occur with the device described in German Patent Publication No. DE-A-3 130 588.

SUMMARY OF THE INVENTION

One purpose of this invention is to propose a gas laser device including means of purifying the gas(es) in the laser active mixture, without the difficulties mentioned above.

One particular purpose is to propose a device that is complete, independent and compact.

Another purpose is to propose a device in which the parasite vibrations and noise due to gas pumps are eliminated.

Another purpose is to avoid cumbersome tubes and pipes to connect the laser gas chamber to the purification means.

Another purpose is to propose a device that significantly increases the time interval between maintenance operations.

Finally, another purpose is to propose a simple, reliable and inexpensive device.

To achieve these purposes, the specific purpose of the present invention is a gas laser device including:

a laser chamber containing at least one active gas, and gas purification means, in communication with free exchange of gas with the chamber.

Communication with free exchange of gas means communication in which no gas circulation is imposed.

More precisely, in the case of the invention, the gas exchange takes place naturally due to physical phenomena such as gravity, diffusion and Brownian displacement of particles without exerting external forces on the gases.

According to particular aspects of the present invention, the gas purification means may comprise a cryostat and/or a catalytic trap capable of retaining impurities and undesirable components in the gas or the laser gas mixture.

Furthermore, according to one particular embodiment of the device according to the present invention, the laser chamber may have one or several appendices (removable or not) connected on the chamber through isolating valves. These appendices each contains one or several gas purification means.

The device according to the present invention may also includes one or several built-in active gas sources connected to the laser chamber. Preferably, the source is connected in free exchange with the chamber.

The present invention also relates to a process for purification of a gas laser chamber in which communication with free exchange of gas takes place between the laser chamber and at least one gas purification means.

Other characteristics and advantages of the present invention will become clearer from the following description with reference to the figures in the attached drawings.

This description is given for illustrative purposes only and is in no way restrictive.

DETAILED DESCRIPTION OF THE PREFERRED EMBODIMENTS

Figure 1:
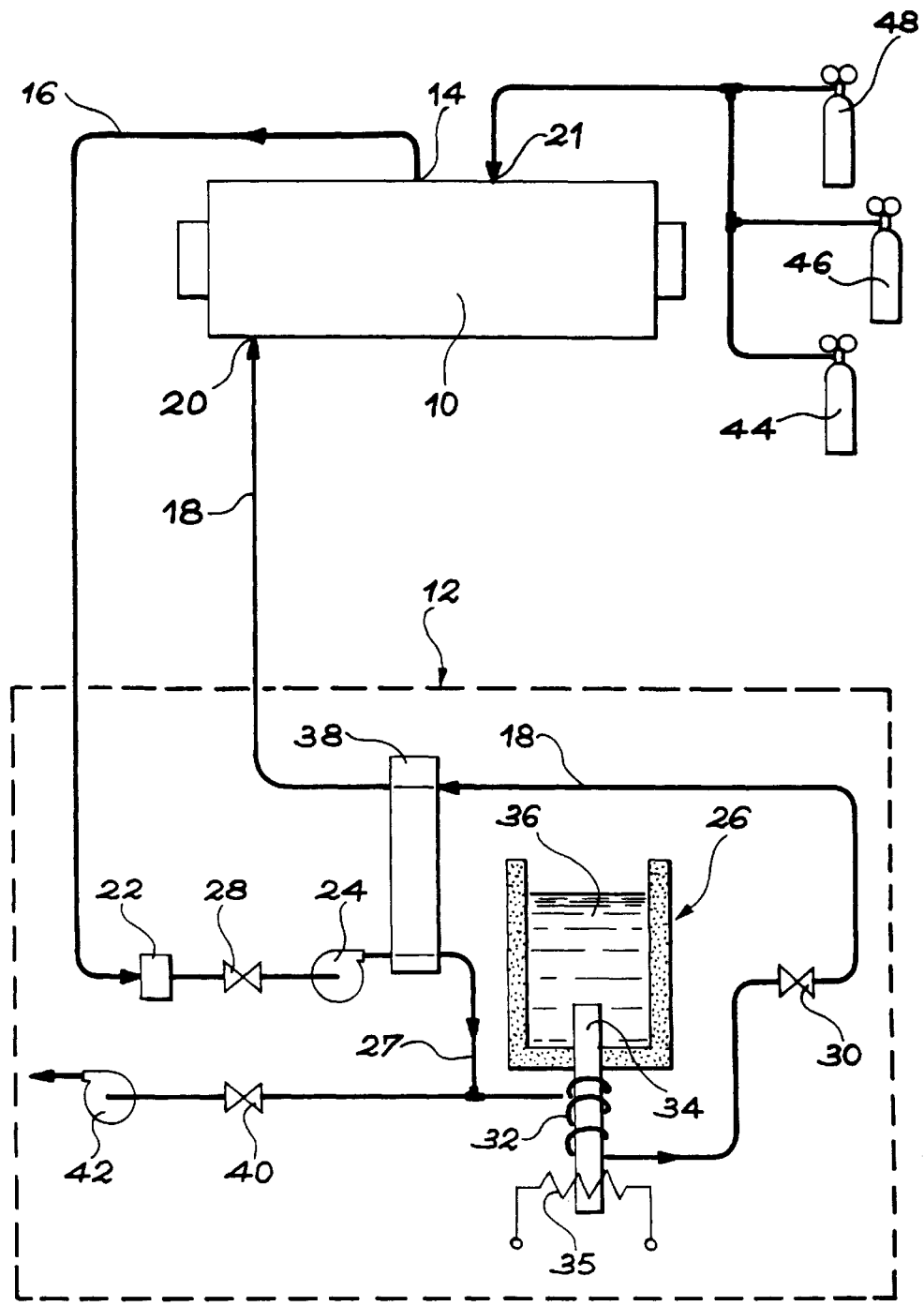
FIG. 1, already described above, is a simplified diagrammatic view of a gas laser equipped with a known type of gas purifier.
Figure 2:
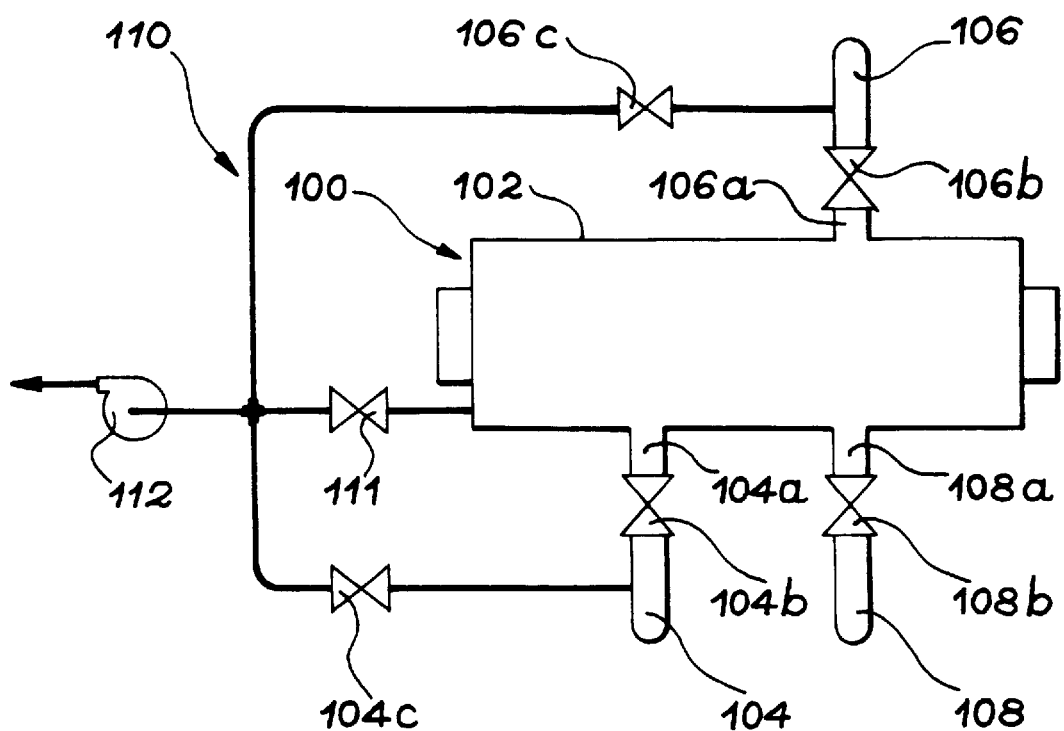
FIG. 2 diagrammatically shows a laser device corresponding to a particular embodiment of the invention.

FIG. 2 is a an overall view of a laser device according to the present invention.

The laser device comprises a laser chamber 100 containing a gas mixture that forms the active amplifying medium. The nature of the mixture depends on the type of laser; further information about this subject can be obtained from the Discussion of Background section above.

The laser chamber 100 is formed from a main body 102 to which a first, second and third appendix 104, 106 and 108 are connected. Each appendix is connected, removably or not, to the main body by means of a fitting 104a, 106a, 108a and an isolating valve 104b, 106b, 108b.

On the example embodiment shown in FIG. 2, the first and second appendices 104 and 106 contain a cryogenic trap and a thermal catalytic trap respectively.

These traps, for which a more detailed description is given in the rest of the text, form gas purification means.

The third appendix 108 forms a gas source used to add new gas to laser chamber 100.

An emptying system 110 comprises a vacuum pump 112 and is connected to the first and second appendices and to the main body 102 of the chamber. This system is designed to purge the laser device during a maintenance operation.

It can be seen that the emptying system 110 comprises pipes connected to the first and second appendices through extraction valves 104c and 106c and is connected to the body 102 of the chamber through an extraction valve 111.

The extraction valves 104c, 106c and 111 are closed and the vacuum pump 112 is stopped in normal operation.

Figure 3:
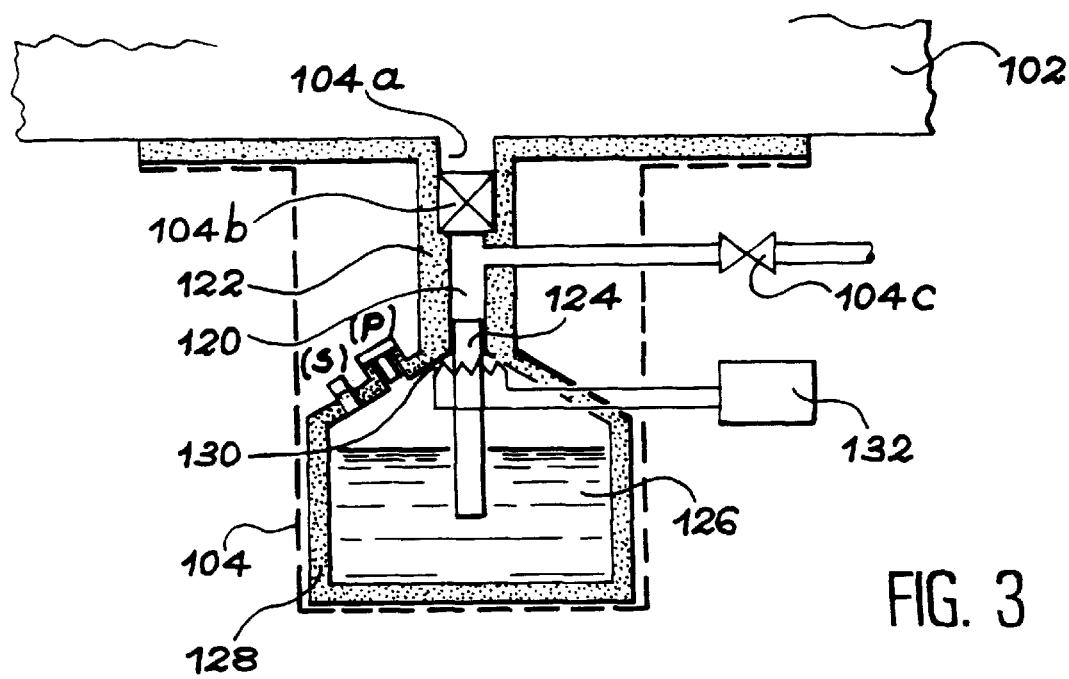
FIGS. 3 and 4 are partial views at larger scale showing appendices to the laser chamber for the device in FIG. 2, these appendices containing cryogenic gas purification means.

FIG. 3 diagrammatically shows a particular embodiment of the first appendix 104 with a cryogenic trap.

In FIG. 3, references 104a, 104b, 104c correspond to the fitting connecting appendix 104 to body 102 of the laser chamber, the isolating valve and appendix extraction valve, respectively.

The cryogenic appendix 104 includes comprises a chamber 120 delimited by a wall 122 made of a thermally insulating material in which a first end of a pin 124 is immersed, made of a heat conducting material such as copper or aluminum.

The cold chamber 120 and pin 124 form a cryogenic trap.

Another end of pin 124 is inserted into a bath of liquid nitrogen 126 which forms a cold source. The liquid nitrogen is contained in a reservoir 128, also made of a thermally insulating material. The reservoir 128 is preferably closed to prevent condensation of moisture. However, it is fitted with a valve S to limit the pressure in the chamber and an orifice P through which the reservoir is filled with cryogenic fluid.

An electric heating resistance 130 in thermal contact with the core 124 carries a current controlled by an external electronic device 132. The electric heating resistance 130 precisely adjusts the temperature of the pin 124 as a function of the components of the gas mixture to be trapped.

When the isolating valve 104b is open, the gas contained in the main body 102 of the laser chamber can diffuse into chamber 120 of the cryogenic appendix by free displacement of gas molecules. The entire body 102 of the chamber and the appendix are then at the same pressure.

In chamber 120, when they come into contact with the cold pin 124, halides and other impurities in the gas mixture are liquefied and/or crystallized.

Considering the thermal gradient between the body of the laser chamber and the cold chamber 120, in other words the bottom of the cryogenic trap, the halides remain close to the cold point formed by the pin 124 at the bottom of the trap.

The impurities are kept at the bottom of the trap (chamber 120) by the effect of gravity and/or density, depending on their physical state. The trap is preferably turned downwards to prevent any convection that could produce an excessive thermal load.

Furthermore, the cold pin 124 in the cryogenic trap generates a thermal stratification effect which also results in a significant energy saving, because the only heat losses to be considered are due to conduction since there is no convection.

The cryogenic appendix 104 is periodically cleaned, in order to extract halides and undesirable impurities that have accumulated in it.

For cleaning, isolating valve 104b is closed to isolate the chamber 120 in appendix 104 from the body 102 of the laser chamber, and extraction valve 104c is open. The halides and other impurities are evaporated, under the effect of natural heating by eliminating the cold source (nitrogen), and/or provoked heating for example by means of the heating resistance 130.

The use of vacuum pump 112 shown in FIG. 2 then evacuates these halides and other undesirable impurities through the extraction valve 104c.

Figure 4:
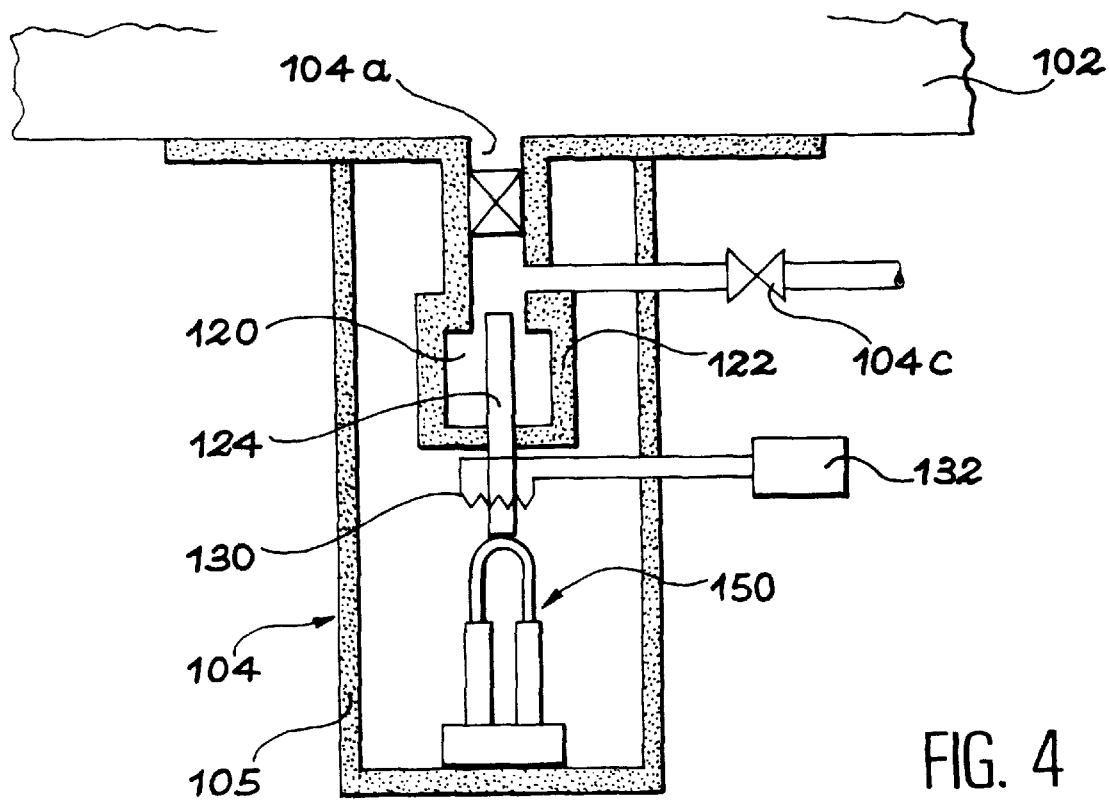

FIG. 4 shows a variant embodiment of the first cryogenic trap appendix 104.

Parts in FIG. 4 identical or similar to parts in FIG. 3 have the same references. Further details about these parts can be obtained by reference to the previous description.

In the appendix 104 in FIG. 4, one end of a heat conducting pin 124 extends into chamber 120 which may be put into communication with the laser chamber by opening the isolating valve 104a.

Another end of pin 124 is in contact with a cryorefrigerator 150 and with an electrical resistance 130.

For example, the cryorefrigerator 150 may be of the Gifford Mac-Mahon type, Stirling type, Joule Thomson type with pressure reduction, or tube type with pulsed gas.

The cold pin 124 in contact with the cryorefrigerator 150 and the electrical heating resistance 130 is kept in thermal equilibrium at a temperature that can be adjusted by varying the electrical current passing through the heating resistance. As for the appendix in FIG. 3, the temperature of the cold pin is adjusted as a function of the components of the gas mixture to be trapped.

FIG. 4 shows that the chamber 120 is delimited by first wall 122 made of a thermal insulating material.

Similarly, the entire appendix 104 is delimited by second wall 105, also made of a thermal insulating material.

Furthermore, thermal insulating foam or a vacuum or any other insulating agent may be added between the first and second walls 122, 105.

As in the device in FIG. 3, halides and impurities are trapped in chamber 120. They are eliminated as in the previous example by natural and/or provoked heating (using the heating resistance 130) and using valve 104c.

The device in FIG. 4 with a cryorefrigerator has an advantage over the device in FIG. 3, in that it can be sealed and can operate independently without external intervention. There is no need to supply it regularly with cryogenic liquid (nitrogen).

Figure 5:
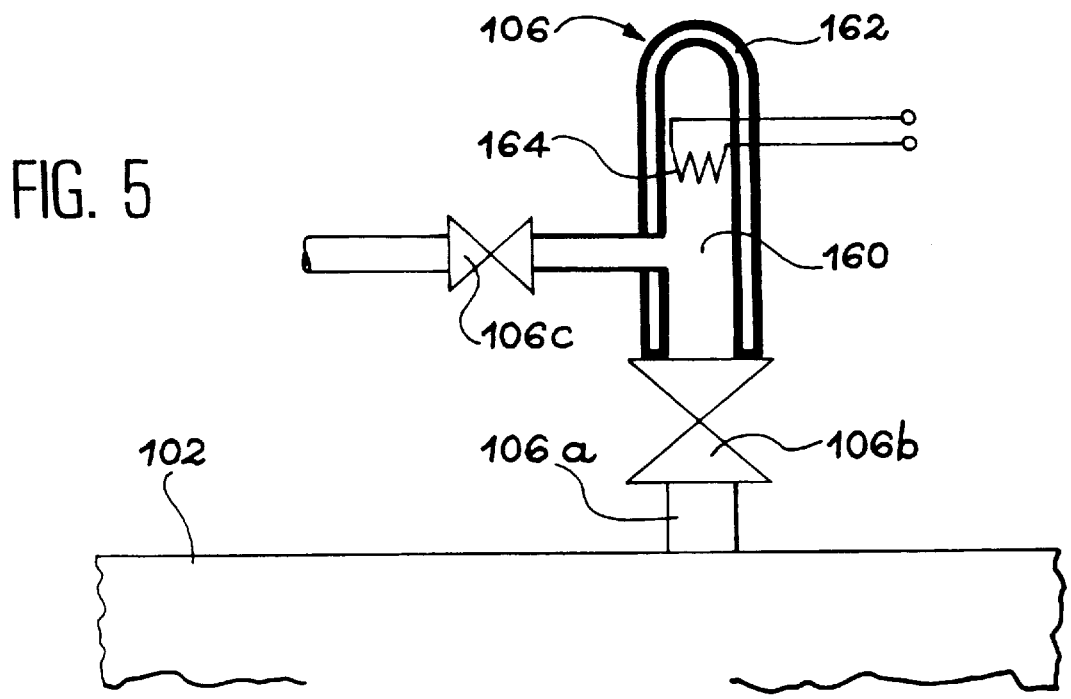
FIG. 5 is a partial view at larger scale showing an appendix to the laser chamber of the device in FIG. 2, the appendix comprising a catalytic trap.

FIG. 5, described below, diagrammatically shows an embodiment of the second appendix 106 of the laser device. The second appendix 106 forms a catalytic thermal trap.

In the same way as halogens and/or undesirable impurities can be retained in a cryogenic trap as described above, they may also be dissociated and filtered by a thermal and catalytic effect.

The second appendix 106 comprises a chamber 160 containing a catalyst material such as platinum or titanium. For example, the chamber is delimited by a wall 162 made of one of these materials, or lined on the inside with one of these materials.

An electrical heating resistance 164, shown very diagrammatically, is provided to heat the catalyst.

The second appendix 106 is connected to the body 102 of the laser chamber through a fitting 106a and through an isolating valve 106b.

When the isolating valve 106b is opened, the chamber 160 of the appendix 106 is in communication with free exchange of gas with the chamber body 102.

Molecules in the gas mixture can then diffuse freely in the chamber 160 of the second appendix.

In this chamber, as described above, the hot catalyst can dissociate gas molecules polluting the active medium.

Periodically, the second appendix 106 may also be purged in order to extract undesirable gases from it. The isolating valve 106b is then closed and the extraction valve 106c is opened for pumping.

Note that the catalytic thermal trap is particularly suitable for high power $CO_2$ type lasers. However, it can be used for other types of lasers.

Figure 6:
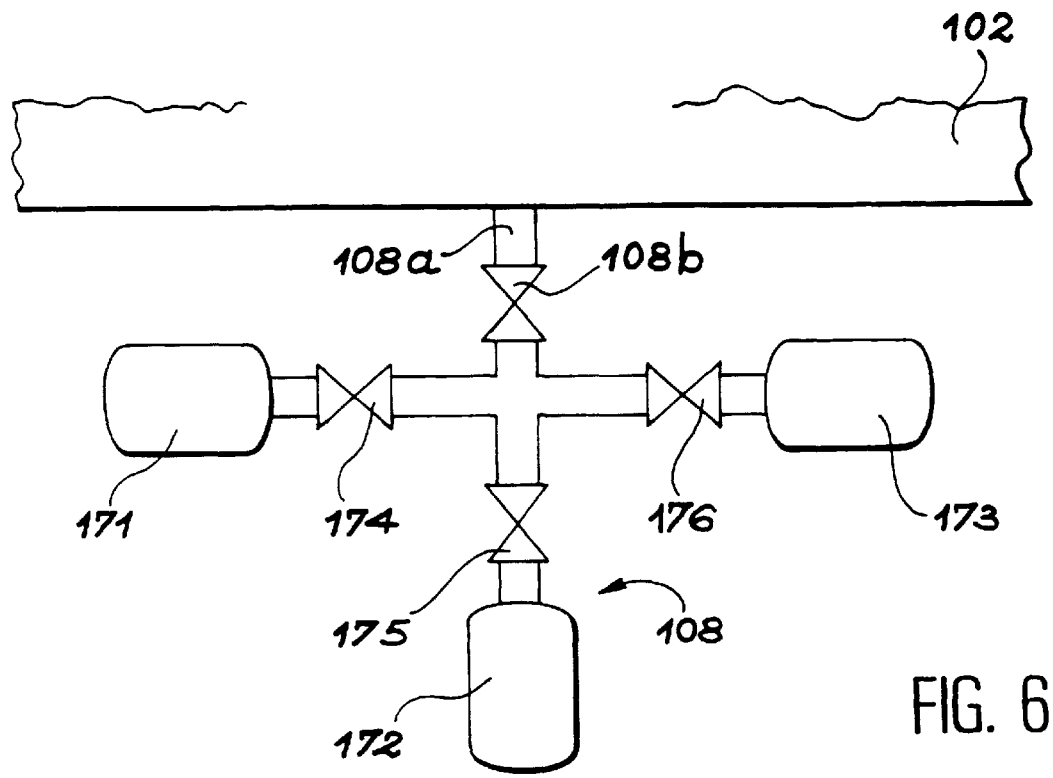
FIGS. 6 and 7 are partial views at a larger scale showing the manufacture of a gas inlet appendix for the device in FIG. 2.

FIG. 6 shows an example embodiment of an active gas source for the device according to the present invention in the form of a third appendix 108.

Unlike the cryostat or the catalytic trap described above, the active gas source does not form a means of gas purification according to the meaning of this the present invention. However, the gas source does provide new gas, exempt of any undesirable compounds, to be added into chamber 102.

The third appendix 108 includes three pressurized gas cylinders 171, 172 and 173 which contain halogen gases, rare gas and buffer gas respectively.

Appendix 108 is connected to the main body 102 of the laser chamber through a fitting 108a and through an isolating valve 108b.

It can also be seen that each gas cylinder is fitted with a delivery valve 174, 175, 176 specific to it.

According to one variant, the three pressurized gas cylinders may be replaced by a single cylinder containing a gas mixture, corresponding to the gas mixture contained in the chamber.

According to another variant, the appendix may simply include a single cylinder containing a makeup halogen gas.

In particular, the addition of new gas compensates for some or all of the losses of halogen compounds due to the formation of impurities in the form of carbon or metal halides.

Furthermore, control means not shown in the figure and connected to delivery valves, may be provided to control the quantity of gas inlet into the chamber. For example, these means may comprise an optoelectronic laser beam control loop designed to measure the emitted energy and to control the addition of new gases as a function of this measurement.

Figure 7:
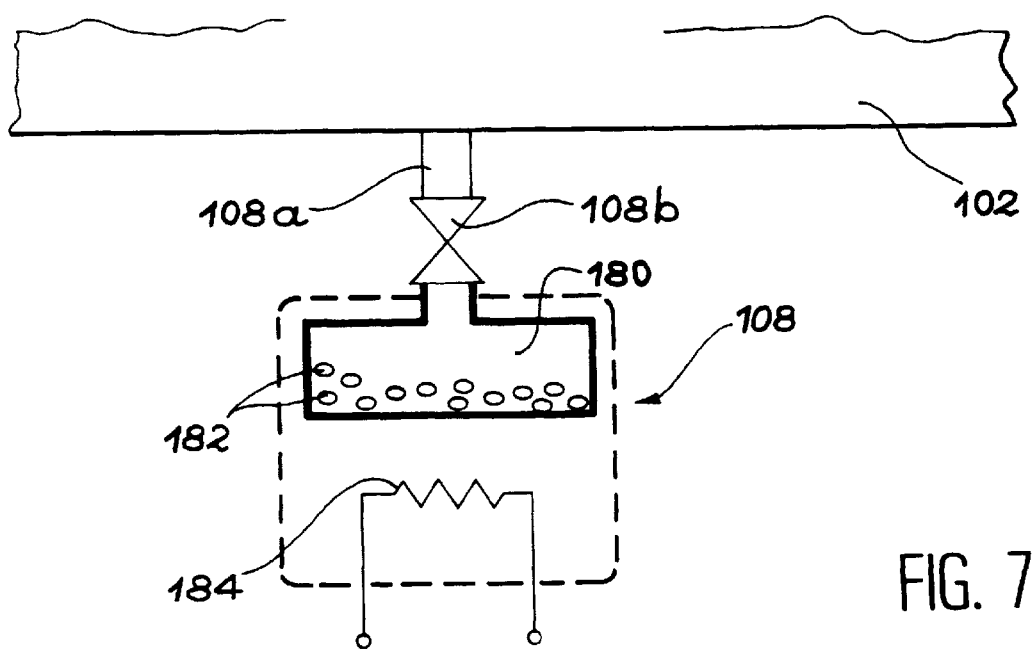

FIG. 7 diagrammatically shows another example embodiment of a source of makeup active gas.

According to this variant, the appendix 108 corresponding to the gas source comprises a degassing chamber 180 containing pellets 182 capable of releasing a gas when they are heated.

The pellets 182 are made of a porous material such as ceramics containing gas trapped in the pores. These gases are one or several makeup gases as described above.

A heating resistance 184 is provided to heat the pellets in a controlled manner and thus extract a controlled quantity of makeup gas from it. The heating resistance may be controlled by servocontrol means for this purpose, not shown in the figures.

An illustration embodiment of the gas source shown in FIG. 7 is described in documents Great Britain Patent Publication No. GB-A-9 124 948 (WO 93/11065) Great Britain Patent Publication No; GBA-9 011 535, and U.S. Pat. No. 5 363 396, mentioned in the references at the end of this description.

Finally, note that appendix 108 is connected to the chamber body through a fitting 108a and through an isolating valve 108b.

Finally, the present invention eliminates all constraints related to circulating pumps and tubes existing on known devices (in which the laser chamber and the purification means are in the form of independent units), in particular due to the use of a single device comprising a laser chamber and appendices including gas purification and/or makeup means.

A laser device according to the present invention is inexpensive to manufacture, not only due to the lack of any connecting circuits between the laser chamber and the purification means, particularly including a circulating pump and connecting tubes, but also because the use of built-in purification means simplifies manufacture of the chamber itself.

The built-in cryogenic trap traps moisture contained in the laser chamber the first time that the laser is used. Moisture is transformed into ice in the cryogenic trap.

Thus, oven drying and desiccation operations of the laser chamber may be accelerated when the laser chamber is made.

Furthermore, the lack of any connecting circuits increases the reliability of the laser.

Finally, note that although the present invention was described with reference to a particular example in which the laser device comprises several gas purification or makeup means, a simpler embodiment of the device would only include some of the described equipment.

What is claimed is:

1. A gas laser device comprising:
    a laser chamber containing at least one active gas; and
    gas purification means in communication with free exchange of gas with said as chamber, wherein said gas purification means being in communication with the free exchange of gas is defined as no gas circulation being imposed so that any one of a pump and a compressor is not needed in order for the gas to be brought to said gas purification means, the gas being brought to said gas purification means only by opening valves so that the gas may flow naturally due to any one of gravity and Brownian displacement of particles.

2. The gas laser device according to claim 1, wherein said gas purification means include a cryostat.

3. The gas laser device according to claim 1, wherein said gas purification means include a catalytic trap.

4. The gas laser device according to claim 1, further comprising at least one built-in active gas source connected to said laser chamber.

5. The gas laser device according to claim 4, wherein said built-in gas source includes at least one gas cylinder.

6. The gas laser device according to claim 4, wherein said built-in gas source includes a controllable diffuser.

7. The gas later device according to claim 2, wherein said cryostat includes a cooling system with liquid nitrogen.

8. The gas laser device according to claim 2, wherein said cryostat includes a cryorefrigerator.

9. The gas laser device according to claim 1, wherein said laser chamber includes at least one appendix containing at least one of said gas purification means and connected to said laser chamber through an isolating valve.

10. The gas laser device according to claim 9, wherein said appendix is fitted with a purge system.

11. A purification process for a gas laser chamber, said process comprising the steps of:

putting said laser chamber into communication with free exchange of gas with at least one gas purification means, wherein the free exchange of gas is defined as no gas circulation being imposed so that any one of a pump and a compressor is not needed in order for the gas to be brought to said gas purification means, the gas being brought to said gas purification means only by opening of valves so that the gas may flow naturally due to any one of gravity and Brownian displacement of particles.

* * * * *